Nov. 3, 1931.   W. P. WHITE   1,830,076
APPARATUS FOR ASSEMBLING GASKETS AND THE LIKE
Filed May 19, 1928
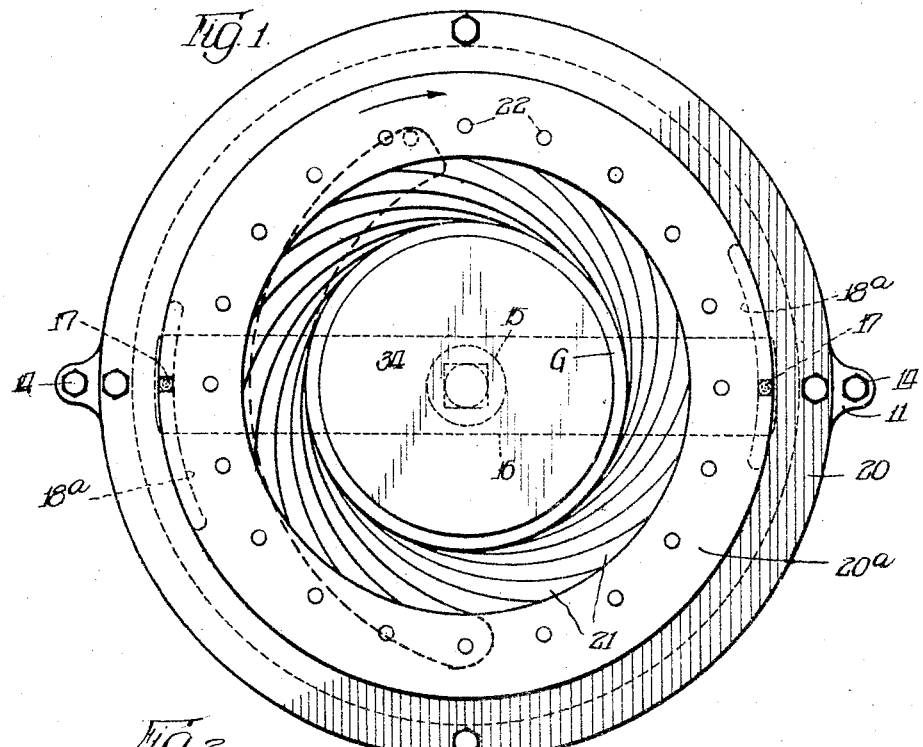
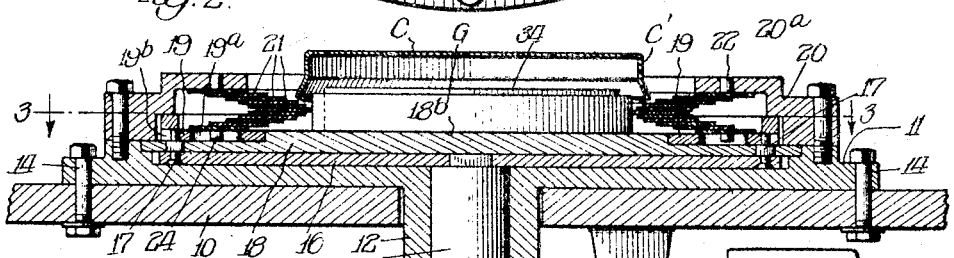
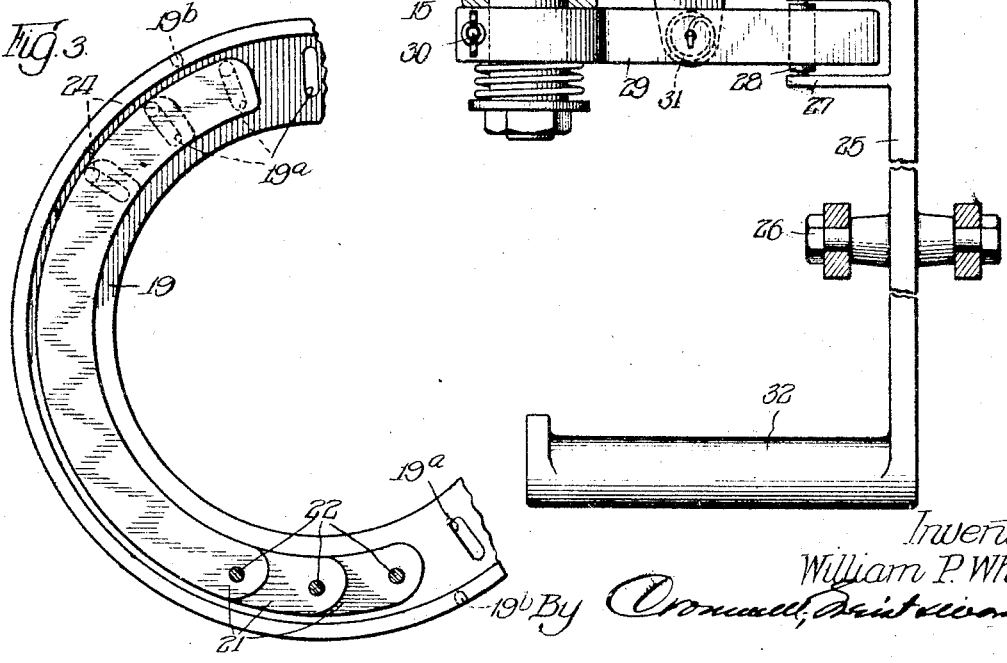
Inventor:
William P. White,
By [signature] attys.

Patented Nov. 3, 1931

1,830,076

UNITED STATES PATENT OFFICE

WILLIAM P. WHITE, OF CHICAGO, ILLINOIS, ASSIGNOR TO WHITE CAP COMPANY, OF CHICAGO, ILLINOIS, A CORPORATION OF DELAWARE

APPARATUS FOR ASSEMBLING GASKETS AND THE LIKE

Application filed May 19, 1928. Serial No. 278,958.

This invention has to do with an apparatus for the constricting of elastic gaskets and the like to permit their insertion, while under elastic compression, into a constraining member, such for example as a closure cap for containers or packing vessels.

It is sometimes desirable to insert elastic members, such as annular gaskets, into tubular or annular holders, in such fashion that the gasket will conform to the contour of the holder and be retained in position therein under more or less circumferential compression or constriction. When the gaskets are quite flexible and of materially greater circumference than the interior of the holder, the proper assembly of the gasket with the holder is rather difficult, involving considerable hand work and attention on the part of the workman.

A general object of the present invention is the provision of an apparatus whereby the assembling operation may be rendered automatic in certain particulars, whereby the amount of hand work may be substantially reduced, and certainty of correct assembly insured, with the result that the rate of output may be greatly increased and uniformity in the product attained incident to rapid and voluminous production.

A special object is the provision of an apparatus whereby the assembly of annular sleeve gaskets in closure caps for containers or packing vessels may be carried on with the advantages indicated above.

Another object is the provision of an apparatus whereby an annular gasket may be placed under a substantial degree of circumferential compression or constriction through reduction of its size by elastic deformation, yet its proper shape maintained, so that upon insertion in the holder it will assume the desired shape by virtue of its own elasticity.

Another object is the provision of such an apparatus which may be operated easily and rapidly without danger of injury to the operator.

Yet another object is the provision of an apparatus having the characteristics above specified and which is adapted to handle gaskets of different sizes.

Other and further objects will be pointed out or indicated hereinafter or will appear to one skilled in the art upon an understanding of the invention or its employment in use.

In the drawings forming a part of this specification is illustrated one form of apparatus embodying the invention, but it is to understood that this is presented for purpose of illustration only and that the invention may be embodied in various other forms of construction, all within the spirit and scope of the appended claims.

In the drawings,

Fig. 1 is a plan view of the apparatus in use,

Fig. 2 is a diametrical sectional elevation with the parts in position as illustrated in Fig. 1, and Fig. 3 is a detail of the segment and ring assembly.

In various manufacturing operations, for example in the manufacture of caps or closures for packing vessels such as jars, tumblers and the like, it is sometimes desired to assemble a flexible elastic gasket of annular form within a holder or constraining member, such as a tube or the skirt or flange of a cap, in such fashion that the gasket will retain its position by virtue of the elasticity of its material. The operation of thus assembling a gasket in a cap or the like has presented a difficult problem where the manufacture must be carried on rapidly and in large quantity, as in the manufacture of closure caps of the sort mentioned, which must be produced at low cost and in very large numbers. By employment of an apparatus embodying the present invention, an elastic and quite flexible gasket of annular or sleeve form may be very substantially constricted or circumferentially compressed, and its proper form or contour preserved, so that it may be easily inserted and accurately positioned within a constraining member of substantially smaller circumference than the gasket in its original size. Thus the gasket, after insertion, may be held under constriction so that by virtue of its own elasticity it will conform closely to the contour of the constraining element and retain itself securely in place.

The nature of the invention may be ascertained from the example of one embodiment shown in the drawings. The apparatus here shown is designed particularly for the assembling of gaskets in closure caps for packing vessels. The portion designated by the reference numeral 10 represents a part of a work table upon which the caps and the gaskets may be handled. Mounted in horizontal position on the table is a base plate 11 which has a depression in its upper side and a bearing sleeve 12 projecting axially from its lower side. The base plate is secured to the table by the bolts 14. A stub shaft 15 is journaled in the bearing sleeve 12 and at its upper end is connected to a cross arm 16, in the form of a flat plate, which may be rotated in the bottom of the depression by rotation of said shaft. Adjacent its ends, the actuating plate 16 carries upwardly projecting pins 17 which pass through arcuate slots 18$^a$ in a supporting plate 18. This plate closes the depression in the base plate and is stationarily mounted therein in such fashion as to permit the actuating plate 16 free rotary movement beneath it. The pins 17 have enlarged guide portions which guide in the slots 18$^a$, and their upper ends extend above the plate 18 and engage in holes in a rotatable ring 19. This ring rests on the plate 18 and said plate has a thickened central portion 18$^b$ which projects up within the central aperture of the ring. Hence, when the shaft 15 is rotated to rotate the actuating plate 16, the latter, by virtue of engagement of its pins with the ring 19, will rotate said ring on the plate 18. An annular covering frame 20 is stationarily mounted on the base plate, and has a ring portion 20$^a$ which projects inwardly over the movable ring 19. Between the stationary ring portion 20$^a$ and the movable ring 19 are disposed a number of segments 21, which are of thin metal. These segments are formed with their inner margins on substantially the same radius as the inner margin of the ring portion 20$^a$, and each is of such length as to extend through a substantial portion of the circle. In the embodiment illustrated there are twenty of these segments, each extending through approximately 144° of the circle on which their inner margins are formed. The segments are assembled one upon another and each carries at one end an anchor pin 22 which is rotatably secured in the stationary ring portion 20$^a$, and at the other end a guide pin 24 which fits in a radial slot 19$^a$ in the movable ring 19. This connection of each segment at one end with the ring portion 20$^a$, and at the other with the movable ring 19 is made possible by the fact that the segments are arranged in successively offset relationship, so that the end of each projects somewhat beyond the end of the next one, as illustrated in Fig. 3. When the ring 19 is rotated in the direction indicated by the arrow in Fig. 1, it will swing the lower ends of the segments inwardly, and inasmuch as the segments collectively encircle the area within the ring portion 20$^a$, such movements will contract or decrease the circumference of the opening between them, such contraction being concentric with the ring portion 20$^a$. In Figs. 1 and 2 the segments are shown in such a contracted position. When the ring 19 is rotated in the opposite direction, the lower ends of the segments will be moved outwardly, to a limit where the inner margins of the segments align vertically on the circle defined by the inner margin of the ring portion 20$^a$. Rotation of the ring 19 to accomplish these adjustments of the segments is effected through rotation of shaft 15, which is operated by a treadle lever 25 pivoted at 26 and carrying at its upper end a yoke 27 in which is mounted a roller 28. This roller cooperates with a lever 29 which is clamped to the shaft 15 by a clamp bolt 30. A coiled spring 31 draws the lever in the direction which rotates the shaft to shift the segments to the outer position, and rearward pressure on the treadle 32 swings the lever 25 to move the lever 29 in the direction which rotates the shaft 15 to move the segments to the inner position, such as that illustrated in Figs. 1 and 2.

By backing off the nut 30, the shaft 15 may be freed for rotation within the clamp of the lever 29, and by the adjustment of the shaft when so freed, the outer limit position of the segments 21 may be varied between the limits afforded by the range of movement of the ring 19. The nut 30 then being set up to clamp the shaft 15 to the lever 29, such adjusted position of the segments 21 will be the open position, from which they are moved inwardly by operation of the treadle as above described. Thus the size of the gasket receiving opening may be accommodated to gaskets of different sizes, and avoid the necessity for a variation in the length of the throw of the treadle.

A mandrel 34 rests freely on the supporting plate 18$^b$ within the opening circumscribed by the segments. This mandrel may be of any of various sizes, depending upon the size of the gasket, in each instance the mandrel being of smaller circumference than the internal circumference of the gasket which is to be handled. When the segments are in their outermost position, their will be a considerable annular space between their inner margins and the side of the mandrel, but when moved to their inner limit, the inner margins of the segments will approach quite close to the side of the mandrel.

In operation of the device, the segments being in their outer position, a gasket G is placed about the mandrel and rests on the base plate 18. The treadle 32 is then pushed forward, swinging the lever 29 rearward and rotating the shaft 15 and the ring 19 in the direction indicated by the arrow in Fig. 1. The resulting inward movement of the segments 21 constricts the gasket against the side of the mandrel, placing the material in the gasket under compression circumferentially. The mandrel maintains the desired contour of the gasket, that in the example illustrated being cylindrical. Thus the circumference of the gasket may be materially reduced and the desired form of the gasket maintained. In the illustration the apparatus and the gasket are shown in the position wherein the gasket is thus constricted, and reduced in circumference. The reference character C designates a cap into which the gasket is to be inserted. It will be assumed that the gasket in its original size was of substantially greater circumference than the inner circumference of the skirt portion C' of the cap, and that by the operation just described the gasket has been reduced in circumference to a size somewhat less than the inner circumference of the cap flange or skirt. The cap is brought to the position over the mandrel as illustrated in Fig. 2, wherein its lower margin rests on the segments adjacent the gasket. The treadle 32 then being quickly released, the spring 31 reversely rotates the shaft 15 and ring 19 so as to release the gasket from the constraining pressure of the segments, the segments being quickly retracted by the action of the spring. At the same time the cap is instantly pushed down over the gasket until the lower rim of its skirt contacts the plate 18. Consequently, upon the elastic expansion of the gasket, which takes place immediately, the gasket will be caught in the surrounding skirt of the cap, where it will remain due to the fact that the gasket is still under some compression circumferentially by the cap skirt, and its elasticity holds it closely to the inner surface of the same. The cap with the gasket thus in place is then removed from the plate 18, and the operation repeated with successive gaskets and caps. Thus the operation of assembling the gaskets in the caps may be carried on rapidly and with certainty that the gaskets after insertion in the caps will have the proper form and assembly therein. In the operations above described, the operator may handle the caps with one hand and the gaskets with the other and operate the treadle with a foot. The apparatus is of particular advantage in that it facilitates the assembling of gaskets which are of relatively flaccid character and which do not hold a true circular shape. The desired circular form is given to the gasket by the apparatus so that it can be properly inserted in the cap, and the compression under which it is placed causes it to maintain the desired form under the constraint of the encircling cap flange. It will be observed also that the compression set up in the gasket is practically equalized throughout its entire extent, wherefore the material of the gasket is equally distributed in the cap and no opportunity is afforded for its humping up or wrinkling in places.

I claim:

1. Apparatus for assembling gaskets and closure caps comprising, in combination, means for supporting an annular gasket, constricting means operable on the periphery of the gasket and having a part adapted to support a closure cap in covering association with the gasket and operating means for moving the constricting means into and out of engagement with the gasket in a generally radial direction.

2. Apparatus for assembling gaskets and closure caps comprising, in combination, means for supporting a sleeve gasket, constricting means movable inwardly with respect to the gasket for engaging the same about its periphery, said constricting means having upwardly presented surfaces adapted to support a closure cap in approximately coaxial association with the gasket, and operating means for actuating the constricting means to reduce the circumference of the gasket.

3. Apparatus for assembling gaskets and holders comprising, in combination, a support for an annular gasket, constricting members movable relatively to one another over the support and arranged to embrace a gasket resting thereon, and actuating means for moving the constricting members to and from the gasket.

4. Apparatus for inserting gaskets in holders comprising, in combination, a support for an annular gasket, relatively movable constricting members associated to afford a gasket receiving space between them for accommodation of a gasket resting on the support, and means for operating the constricting members to contract the gasket receiving space.

5. Apparatus for assembling gaskets and holders comprising, in combination, relatively movable constricting members associated to afford a substantially circular gasket receiving space between them, and means for actuating said constricting members to contract the gasket receiving space concentrically.

6. Apparatus for assembling gaskets and holders comprising, in combination, a substantially circular mandrel, constricting members arranged to encircle the mandrel and having work-supporting surfaces presented endwise of the mandrel, and means for moving the constricting members toward and from the axis of the mandrel.

7. Apparatus as specified in claim 6 together with a gasket support arranged to support an annular gasket between the mandrel and constricting members.

8. Apparatus for assembling gaskets and holders comprising, in combination, a gasket support, constricting members associated with said support in position to encircle a gasket resting thereon, and means for moving the constricting members into and out of engagement with the periphery of a gasket resting upon the support, said constricting members being arranged to engage the gasket in such locations as to leave its upper peripheral portion exposed.

9. Apparatus for assembling gaskets and holders comprising, in combination, a circular mandrel, a constricting device of variable area encircling the mandrel, and means for extending and contracting the surface area of the constricting device concentrically about the mandrel.

10. Apparatus as specified in claim 9 and in which the mandrel is free for movement eccentrically within the constricting device.

11. Apparatus for inserting gaskets in holders comprising, in combination, a circular mandrel, an annular constricting device encircling the mandrel, a support for maintaining an annular gasket between the constricting device and mandrel in encircling relationship to the latter, and actuating means for contracting the constricting device to compress the gasket about the mandrel.

12. Apparatus for assembling gaskets and holders comprising, in combination, a constricting device affording a substantially annular gasket receiving opening, means for operating the constricting device to contract the gasket receiving opening, and means effective on the constricting device to actuate the same with a quick movement to expand the gasket receiving opening.

13. Apparatus for assembling gaskets and holders comprising, in combination, a plurality of segments associated to form a constricting device affording an approximately circular opening and means for moving the segments relative to one another to contract said opening.

14. Apparatus for assembling gaskets and holders comprising, in combination, a support, a constricting device movable across a portion of the area of the support and adapted to engage a gasket on the support about the entire periphery of the gasket, and means for contracting and expanding the constricting device.

15. Apparatus for assembling gaskets and holders comprising, in combination, a support, a fixed ring and rotatable ring arranged in parallel relationship above the support, a plurality of of segments each connected with the respective rings and associated so that collectively they form an approximately circular constricting member, a shaft arranged below the support concentrically with the rings, an operative connection between said shaft and said rotatable ring whereby the latter may be rotated, and means for actuating the shaft.

16. Apparatus for assembling gaskets and holders comprising, in combination, a gasket support, a mandrel movable parallel with said support, a constricting device encompassing the mandrel, and means for contracting the constricting device toward the mandrel.

17. Apparatus for assembling gaskets and holders comprising, in combination, a plurality of arcuate members associated to form an annular constricting member and movable relative to one another, means for supporting a gasket within the annular constricting member, and means for moving the arcuate members simultaneously toward a common center to apply constricting pressure to the periphery of the gasket.

In testimony whereof I have hereunto subscribed my name.

WILLIAM P. WHITE.